(12) United States Patent
Ciepiel et al.

(10) Patent No.: US 11,478,766 B2
(45) Date of Patent: Oct. 25, 2022

(54) INTELLIGENT BLENDING SYSTEM

(71) Applicant: Vita-Mix Management Corporation, Olmsted Township, OH (US)

(72) Inventors: Anthony Ciepiel, Hudson, OH (US); David Kolar, Stow, OH (US); Kang Zhang, Olmsted Township, OH (US); Chad Markovich, Olmsted Township, OH (US); Judson Cummins, Olmsted Township, OH (US); Mark Fleming, Strongsville, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 280 days.

(21) Appl. No.: 16/022,789

(22) Filed: Jun. 29, 2018

(65) Prior Publication Data
US 2019/0001288 A1   Jan. 3, 2019

Related U.S. Application Data

(60) Provisional application No. 62/527,781, filed on Jun. 30, 2017.

(51) Int. Cl.
*B01F 33/00* (2022.01)
*B01F 33/84* (2022.01)
(Continued)

(52) U.S. Cl.
CPC ......... *B01F 33/8442* (2022.01); *A47J 36/321* (2018.08); *A47J 43/0716* (2013.01); *B01F 33/848* (2022.01); *B01F 35/2117* (2022.01); *B01F 35/2209* (2022.01); *G06K 7/10722* (2013.01); *G06K 7/1413* (2013.01);
(Continued)

(58) Field of Classification Search
CPC .............. B01F 13/1063; B01F 33/8442; B01F 35/2209; B01F 35/2117; B01F 33/848; B01F 2101/14; A47J 36/321; A47J 31/521; A47J 31/44; A46J 31/44; G06K 7/10722;
(Continued)

(56) References Cited

U.S. PATENT DOCUMENTS 2,282,866 A    5/1942  Hagen
2,955,186 A   10/1960  Ritter
(Continued)

FOREIGN PATENT DOCUMENTS

CN    101194807   6/2008
CN    10904700    5/2012
(Continued)

OTHER PUBLICATIONS

Supplementary European Search Report for Application No. 16752897.5 relating to PCT/US2016018053, dated Nov. 14, 2018.
(Continued)

*Primary Examiner* — Anshu Bhatia
(74) *Attorney, Agent, or Firm* — McDonald Hopkins LLC

(57) ABSTRACT

A blending system includes a blender base and a container. The blender base includes a housing that houses a motor. The container is attachable to the blender base. The blending system includes a user device that communicates with the blender base. The user device may communicate with a remote computing device. The user device generates instructions and recipes for the blender base.

18 Claims, 9 Drawing Sheets

(51) Int. Cl.
| | |
|---|---|
| *G06K 7/10* | (2006.01) |
| *G06K 7/14* | (2006.01) |
| *A47J 43/07* | (2006.01) |
| *A47J 36/32* | (2006.01) |
| *G07F 17/00* | (2006.01) |
| *G06Q 20/32* | (2012.01) |
| *G07F 9/00* | (2006.01) |
| *B01F 35/21* | (2022.01) |
| *B01F 35/22* | (2022.01) |
| *G06Q 20/20* | (2012.01) |
| *A47J 31/52* | (2006.01) |
| *B01F 101/14* | (2022.01) |

(52) U.S. Cl.
CPC ......... *G06Q 20/3278* (2013.01); *G07F 9/001* (2020.05); *G07F 9/002* (2020.05); *G07F 17/0064* (2013.01); *A47J 31/521* (2018.08); *B01F 2101/14* (2022.01); *G05B 2219/39242* (2013.01); *G06Q 20/20* (2013.01)

(58) Field of Classification Search
CPC ....... G06K 7/1413; G05B 2219/39242; G06Q 20/20
See application file for complete search history.

(56) References Cited

U.S. PATENT DOCUMENTS

| | | | |
|---|---|---|---|
| 3,299,226 A | | 1/1967 | Edwards |
| 3,548,280 A | | 12/1970 | Cockroft |
| 3,731,059 A | | 5/1973 | Wilson |
| 3,837,587 A | * | 9/1974 | Walter .................. A47J 43/042 |
| | | | 241/260.1 |
| 3,943,421 A | | 3/1976 | Shibata et al. |
| 3,951,351 A | | 4/1976 | Ernster et al. |
| 4,335,860 A | | 6/1982 | Grandel et al. |
| 4,471,915 A | | 9/1984 | Levin et al. |
| 4,568,193 A | | 2/1986 | Contri et al. |
| 4,678,881 A | | 7/1987 | Griffith |
| 4,686,356 A | | 8/1987 | Ueda et al. |
| 4,741,482 A | | 5/1988 | Coggiola et al. |
| 4,762,057 A | | 8/1988 | Hirota et al. |
| 4,822,172 A | | 4/1989 | Stottmann |
| 4,885,917 A | | 12/1989 | Spector |
| 4,893,942 A | | 1/1990 | Stottmann |
| 4,913,555 A | | 4/1990 | Maeda et al. |
| 4,968,864 A | | 11/1990 | Doi et al. |
| 4,993,840 A | | 2/1991 | Maeda et al. |
| 5,156,867 A | | 10/1992 | Leuthold et al. |
| 5,267,211 A | | 11/1993 | Kobayashi et al. |
| 5,267,790 A | | 12/1993 | Sutherland et al. |
| 5,273,358 A | | 12/1993 | Byrne et al. |
| 5,274,207 A | | 12/1993 | Griffith |
| 5,316,382 A | | 5/1994 | Penaranda et al. |
| 5,347,205 A | | 9/1994 | Piland |
| 5,363,746 A | | 11/1994 | Gordon |
| 5,368,384 A | | 11/1994 | Duncan et al. |
| 5,392,695 A | | 2/1995 | Junkel |
| 5,478,149 A | | 12/1995 | Quigg |
| 5,531,153 A | | 7/1996 | Maruyama et al. |
| 5,556,198 A | | 9/1996 | Dickson, Jr. et al. |
| 5,562,020 A | | 10/1996 | Shigeshiro |
| 5,567,049 A | | 10/1996 | Beaudet et al. |
| 5,577,735 A | | 11/1996 | Reed et al. |
| 5,605,090 A | | 2/1997 | Mantani et al. |
| 5,655,834 A | | 8/1997 | Dickson |
| 5,660,467 A | | 8/1997 | Mineo et al. |
| 5,768,978 A | | 6/1998 | Dorner et al. |
| 5,829,341 A | | 11/1998 | Lin |
| 5,839,356 A | | 11/1998 | Dornbush et al. |
| 5,852,968 A | | 12/1998 | Sundquist |
| 5,855,431 A | | 1/1999 | Costanzo |
| 5,967,021 A | | 10/1999 | Yung |
| 6,095,677 A | | 8/2000 | Karkos, Jr. et al. |
| 6,149,035 A | | 11/2000 | Gorski et al. |
| 6,210,033 B1 | | 4/2001 | Karkos, Jr. et al. |
| 6,318,247 B1 | | 11/2001 | Di Nunzio et al. |
| 6,325,312 B1 | | 12/2001 | Karkos, Jr. |
| 6,336,603 B1 | | 1/2002 | Karkos, Jr. et al. |
| 6,364,522 B2 | | 4/2002 | Kolar et al. |
| 6,402,365 B1 | | 6/2002 | Wong |
| 6,416,215 B1 | | 7/2002 | Terentiev |
| 6,460,368 B1 | | 10/2002 | Grande Damaso |
| 6,494,390 B1 | | 12/2002 | Khait et al. |
| 6,513,966 B1 | | 2/2003 | Gort-Barten et al. |
| 6,540,394 B2 | | 4/2003 | Juriga |
| 6,554,466 B1 | | 4/2003 | Lee |
| 6,568,843 B1 | | 5/2003 | Lai |
| 6,595,113 B1 | | 7/2003 | Chang |
| 6,609,821 B2 | | 8/2003 | Wulf et al. |
| 6,629,492 B1 | | 10/2003 | Li |
| 6,637,681 B1 | | 10/2003 | Pianca et al. |
| 6,712,497 B2 | | 3/2004 | Jersey et al. |
| 6,758,593 B1 | | 7/2004 | Terentiev |
| 6,793,167 B2 | | 9/2004 | Karkos, Jr. et al. |
| 6,811,301 B2 | | 11/2004 | Packard |
| 6,899,454 B2 | | 5/2005 | Terentiev |
| 6,910,800 B2 | | 6/2005 | Wu |
| 6,959,562 B2 | | 11/2005 | Navedo et al. |
| 7,270,156 B2 | | 9/2007 | Beesley et al. |
| 7,290,724 B2 | | 11/2007 | Lin et al. |
| 7,314,307 B2 | | 1/2008 | Cai |
| 7,318,666 B1 | | 1/2008 | Lin |
| 7,355,150 B2 | | 4/2008 | Baarman et al. |
| 7,407,320 B1 | | 8/2008 | Lin |
| 7,422,361 B2 | | 9/2008 | Pryor |
| 7,422,362 B2 | | 9/2008 | Sands |
| 7,530,510 B2 | | 5/2009 | Newman et al. |
| 7,780,337 B2 | | 8/2010 | Peng |
| 7,871,196 B2 | | 1/2011 | Lin |
| 7,905,728 B2 | | 3/2011 | Piontek |
| 7,959,347 B2 | | 6/2011 | Pryor et al. |
| 7,997,786 B2 | | 8/2011 | Liu |
| 8,087,818 B2 | | 1/2012 | Drees |
| 8,186,872 B2 | | 5/2012 | Bartholomew et al. |
| 8,220,730 B2 | | 7/2012 | Ferraby et al. |
| 8,230,774 B1 | | 7/2012 | Hunte |
| 8,240,909 B2 | | 8/2012 | Athey et al. |
| 8,282,268 B2 | | 10/2012 | Karkos, Jr. et al. |
| 8,292,490 B2 | | 10/2012 | Bohannon, Jr. et al. |
| 8,360,480 B2 | | 1/2013 | Athey et al. |
| 8,376,253 B2 | | 2/2013 | Obiak et al. |
| 8,403,555 B2 | | 3/2013 | Wu |
| 8,403,556 B2 | | 3/2013 | Wu |
| 8,441,361 B2 | | 5/2013 | McAlister |
| 8,480,292 B2 | | 7/2013 | Dunshine et al. |
| 8,529,118 B2 | | 9/2013 | Davis et al. |
| 8,550,388 B2 | | 10/2013 | Donaldson et al. |
| 8,608,371 B2 | | 12/2013 | Bartholomew et al. |
| 8,616,250 B2 | | 12/2013 | Herbert |
| 8,621,982 B2 | | 1/2014 | Nosler et al. |
| 8,621,990 B2 | | 1/2014 | Fang et al. |
| 8,702,300 B2 | | 4/2014 | Audette |
| 8,721,162 B2 | | 5/2014 | Claesson |
| 8,813,635 B2 | | 8/2014 | Dragan |
| 8,814,072 B2 | | 8/2014 | Gushwa |
| 9,084,512 B2 | | 7/2015 | Boozer |
| 9,155,330 B1 | | 10/2015 | Shtivelman |
| 9,259,122 B2 | | 2/2016 | Martin |
| 9,610,553 B2 | | 4/2017 | Goodson |
| 2002/0009016 A1 | | 1/2002 | Ancona et al. |
| 2004/0203387 A1 | | 10/2004 | Grannan |
| 2005/0229795 A1 | | 10/2005 | Stuckey |
| 2006/0169715 A1 | | 8/2006 | Emmendorfer et al. |
| 2006/0214765 A1 | | 9/2006 | Pitchers et al. |
| 2008/0264927 A1 | | 10/2008 | Peng |
| 2009/0084274 A1 | | 4/2009 | Kovacic |
| 2009/0259688 A1 | | 10/2009 | Do |
| 2009/0260523 A1 | | 10/2009 | Peng |
| 2010/0044303 A1 | | 2/2010 | Perrault |
| 2010/0046323 A1 | | 2/2010 | Tien et al. |
| 2011/0222367 A1 | | 9/2011 | Allen |
| 2011/0248108 A1 | | 10/2011 | Carriere |

(56) References Cited

U.S. PATENT DOCUMENTS

| | | | |
|---|---|---|---|
| 2012/0156344 A1* | 6/2012 | Studor | A47J 31/525 426/433 |
| 2013/0033957 A1 | 2/2013 | Huang | |
| 2013/0043337 A1 | 2/2013 | Rukavina | |
| 2013/0319034 A1 | 12/2013 | Kounlavong | |
| 2013/0334349 A1 | 12/2013 | Carden | |
| 2014/0095479 A1 | 4/2014 | Chang | |
| 2014/0269154 A1 | 9/2014 | Kolar | |
| 2018/0272300 A1* | 9/2018 | Wallace | B01F 15/00194 |

FOREIGN PATENT DOCUMENTS

| | | |
|---|---|---|
| EP | 0024992 | 3/1981 |
| EP | 0041082 | 12/1981 |
| EP | 1647217 | 4/2006 |
| EP | 1688046 | 8/2006 |
| WO | 2005092158 | 10/2005 |
| WO | 2006104651 | 10/2006 |
| WO | 2006124051 | 11/2006 |
| WO | 2011/113083 | 9/2011 |
| WO | 2014008926 | 1/2014 |
| WO | 2014009339 | 1/2014 |
| WO | 2014121838 | 8/2014 |
| WO | 2014122254 | 8/2014 |
| WO | 2014122260 | 8/2014 |
| WO | 2015138961 | 9/2015 |

OTHER PUBLICATIONS

International Search Report and the Written Opinion of the International Searching Authority, PCT/US2016/018053, Vita-Mix Management Corporation, dated Jul. 26, 2016.

Copenheaver, Blaine, International Search Report and Written Opinion, PCT/US2014/029134, dated Aug. 1, 2014, International Search Authority/USA.

Young, Lee W., International Search Report and Written Opinion, PCT/US2014/029384, dated Aug. 11, 2014, International Search Authority/USA.

Gaggia Espanola, S.A., Ipanema, brochure, undated.

Gaggia Espanola, S.A., Copacabana, brochure, undated.

Gaggia Espanola, S.A., Ipanema Space-Saving High Technology, brochure, undated.

Communication of the European Patent Office for Application No. 14756728.3 dated Nov. 22, 2018; 4 pages.

Young, Lee W., International Search Report and Written Opinion, PCT/US/2014/29446, dated Aug. 5, 2014, International Search Authority/USA.

International Search Report and the Written Opinion of the International Searching Authority, PCT/US2014/019866, Vita-Mix Corporation, dated Jun. 25, 2014.

\* cited by examiner

POS Selected Drink: Gold Medal Smoothie
Yield: 3 c ( 720 ml ) (24.3 oz.)

Station 1
1 scoop (34 g) protein powder (1.20 oz.)
1/8 teaspoon ground nutmeg
2 Tablespoons (30 ml) sweetener (honey) (1.06 oz.)

Station 2
1/2 cup (120 ml) water (4.23 oz.)

Station 3
1 banana, peeled
1/2 cup (30 g) diced cantaloupe (1.06 oz.)
1/4 cup (30 g) chopped carrots (1.06 oz.)
1/4 cup (40 g) orange segments (1.41 oz.)
1/4 lemon, peeled, seeded
1/2 cup (78 g) fresh pineapple chunks (2.75 oz.)

Station 4
2 cups (480 ml) shaved ice (16.2 oz)

Station 5

| Blend | Speed | Time | Ramp |
|-------|-------|------|------|
| A | 50 | 4 | 1 |
| B | 90 | 4 | 2 |
| C | 180 | 24 | 3 |
| D | 14 | 0 | 1 |

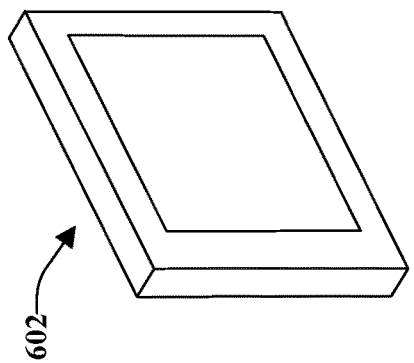

FIG. 7

INTELLIGENT BLENDING SYSTEM

CROSS-REFERENCE TO RELATED APPLICATION

This application claims priority to U.S. Provisional Patent Application No. 62/527,781 entitled "INTELLIGENT BLENDING SYSTEM," filed on Jun. 30, 2017, which is incorporated herein by reference in its entirety.

TECHNICAL FIELD

The present invention relates to a blending system and, more particularly, to a blending system that monitors and directs a blending process for blending of foodstuff and a blending container with an integrated scale.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with a commercial or restaurant-grade blender. Such drinks also may be made at home, using a personal blender.

One disadvantage with making any such drinks (examples of which are identified above), or utilizing blenders, is the difficulty in blending to a user's specific tastes or preferences due to the specific ingredients required in some recipes. Another disadvantage with making such drinks is the difficulty in measuring ingredients.

Users tend to add ingredients without measuring properly, in a wrong order, or by estimating amounts. Further, users may alter recipes to avoid or include certain ingredients. These alterations may change a resulting consistency or texture of a final blended drink. Users also struggle with fully utilizing the features of appliances in their kitchen and products and services they are purchasing from or subscribed to, as well as have issues consistently using their equipment to produce good results.

In commercial kitchens, businesses that make recipe-based beverages struggle to have consistency in their product. This is caused by a number of factors including incorrect ingredients, incorrect order of the ingredients, incorrect amounts of a given ingredient, and potentially incorrect processing of the ingredients.

Commercial kitchens must rely on proper training and well-defined procedures. Companies are constantly creating more product offerings, and these establishments frequently have a constant turnover of employees. These issues make consistency in how a specific product is made even more challenging. Color-coded measuring scoops and custom-printed instructions for a given order are implemented in some commercial kitchens to try to achieve the desired consistency in their products.

Therefore, a need exists for improved systems and methods for blending contents in a blender. Further, there is a need for monitoring and directing preparation of foodstuff.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A blender system is described herein. The blending system may include a blender base comprising a housing and a motor disposed within the housing, a container selectively attached to the blender base, and a user device operatively communicating with the blender base. The user device may operatively alter an inventory stored in a memory, wherein the inventory comprises a list of ingredients and quantities of the available ingredients based on recognizing ingredients and monitoring use of the ingredients. In another aspect, the user device may comprise at least one sensor operatively capturing an image of at least one ingredient, capturing an image of packaging of the at least one ingredient, a bar code associated with the at least one ingredient, or an identification code associated with the at least one ingredient. The blending system may comprise a weight sensor that operatively measures an amount of at least one ingredient added into the container. The user device may monitor the use of the ingredients by altering the inventor based at least in part on measurements received from the weight sensor. It is noted that the container may comprise the weight sensor, the blender base may comprise the weight sensor, or the weight sensor may selectively attach to at least one of the blender base or the container. Moreover, the user device may operatively send instructions to a remote database to alter the inventory.

Also described is a blending system comprising a blender base comprising a housing and a motor disposed within the housing, a container selectively attached to the blender base, a user device operatively communicating with the blender base, and a remote computing device communicatively coupled to the user device. The user device generates instructions for preparation of foodstuff according to information received from the remote computing device. The remote computing device comprises an application program interface defining protocols for communication with at least one of the blender base or the user device. In an example, the remote computing device comprises a business logic component. The business logic component receives information from the blender base regarding sensory data. The business logic may additionally or alternatively automatically order ingredients based on a history of foodstuff preparation.

Further described is a blender system comprising a point of sale device operatively receiving input defining an order of a product to be blended, a blender station comprising a blender base comprising a housing and a motor disposed within the housing, and at least one other station for preparing the product. The point of sale device associates a blending container with the product and defines a set of instructions for preparing the product, the set of instructions to be performed at least partial at the blender station and the at least one other station. The point of sale device, the blender station, and the at least one other station each comprise at least one near field communication device. The blending container comprises a near field communication device and that stores an identification token and communicates the identification token with at least one of the point of sale device, the blender station, and the at least one other station. The point of sale device associates the identification token with the order. The at least one other station identifies operatively communicates with the near field communication device of the container to receive the identification token, and communicated with the point of sale device to determine whether the identification token is associate with an open order. In an aspect, the at least one station comprises at least one of a liquid dispensing station, a dry-goods dispensing station, or an ice dispensing station. Further, the blending system may comprise a database storing blending container profiles, the blending container profiles comprising identification tokens and histories of use.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which:

FIG. 7 is a an exemplary preparation process in accordance with various embodiments described herein;

DETAILED DESCRIPTION

Figure 1:
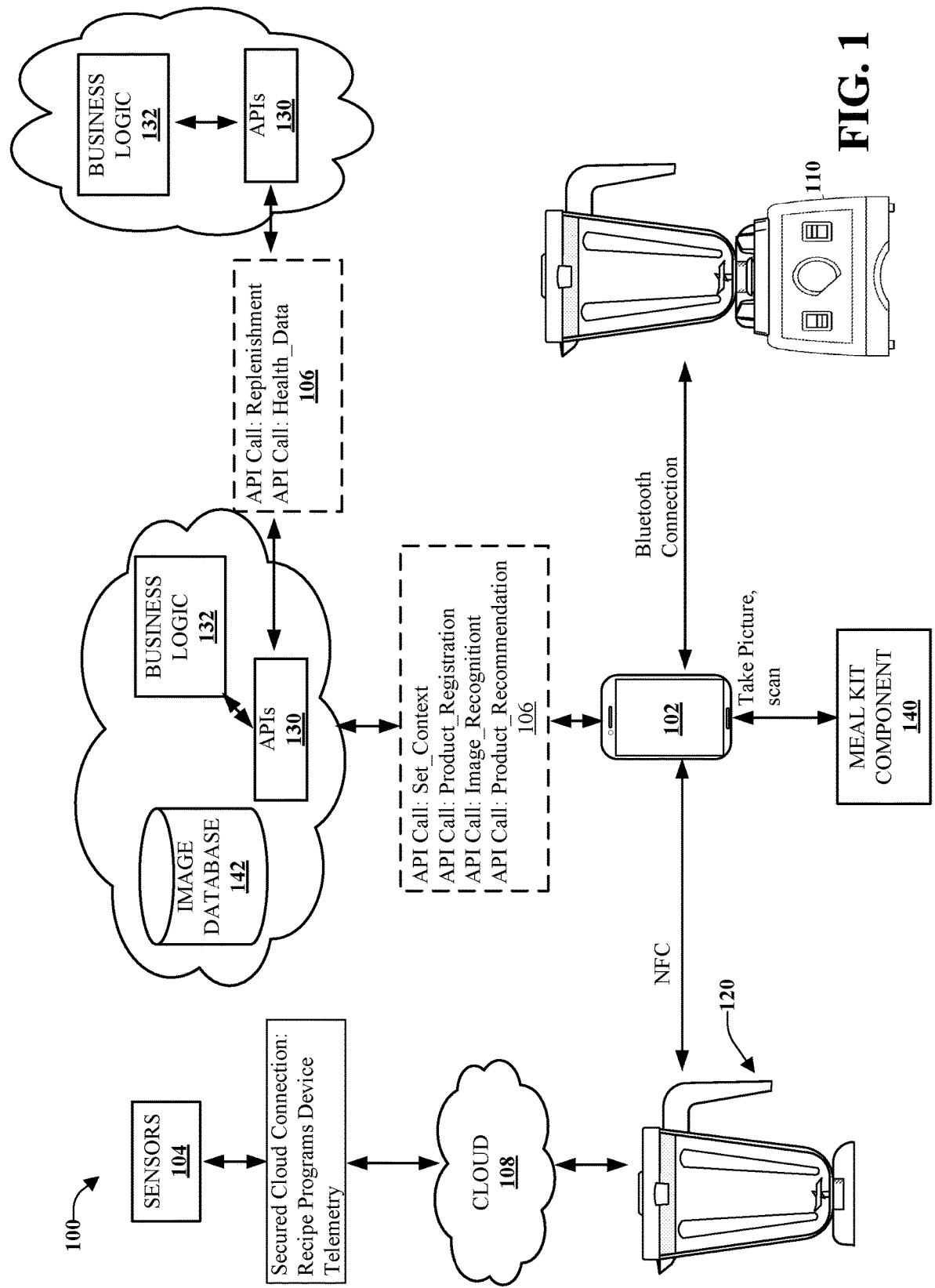
FIG. 1 operating environment or functional blending system capable of implementing one or more systems, apparatuses, or processes described above in accordance with various embodiments described here herein

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms such as "access point," "server," and the like, are utilized interchangeably, and refer to a network component or appliance that serves and receives control data, voice, video, sound, or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Still further, "user," "customer," "consumer," may include a commercial establishment(s), such as a restaurant, restaurant chain, commercial kitchen, grocery store, convenience store, ice-cream shop, smoothie restaurant, or the like.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

A network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device and/or blender device owned by the user. The user account may also include information such as relationships with other users, application usage, location, personal settings, and other information.

Embodiments may utilize substantially any wired or wireless network. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, $x^{th}$ generation long term evolution, or another IEEE 802.XX technology. Furthermore, embodiments may utilize wired communications.

It is noted that, terms "user equipment," "user device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), desktop computers, etc.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the like. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blending systems, various other food preparation systems, and the like. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attached. The blending container may be powered in any appropriate manner, such as disclosed in U.S. patent application Ser. No. 14/213,557, entitled Powered Blending Container, which is hereby incorporated by reference. In another aspect, described blending systems may include devices and methods such as those disclosed in U.S. patent application Ser. No. 14/623,207, entitled Intelligent Blending System, which is hereby incorporated by reference.

Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Traditionally, consumers rely on their knowledge of their kitchen appliances, food, and cooking knowledge to utilize the features of their appliances. Consumers may also subscribe to grocery or meal kit delivery services. Such deliver systems may not have any context of each consumer's cooking ability or appliances that they own. Thus, consumers may have to rely on their cooking skills to select meal kits and attempt to produce meals based on the meal kit.

Aspects of systems, apparatuses or processes described herein generally relate to blending or mixing systems. Embodiments of blender systems and methods may identify a user's equipment, identify food items a user has, food items or services to which a user subscribes, and may fuse the information together to provide a better cooking experience. For instance, described embodiments may determine available recipes, generate instructions for executing a recipe, order food items or devices, and the like based at least in part on the fused information.

In an embodiment, a user device may include a software application or "app." The app may communicate with various devices, users, databases or the like. For instance, the app may interact with a user, a blender device, a blender container, sensors, other user devices (e.g., tablets, scales, refrigerators, other appliances, etc.), databases (including third-party databases), and the like.

Another aspect of the disclosed subject matter relates to determining dietary or fitness goals based on a history of utilized recipes and defined rules. A user may set preferences for fitness or dietary goals (e.g., calories, etc.). The fitness/dietary goals may include limits or thresholds on intake of certain substances or properties of substances (e.g., sugars, fats, calories, sodium, etc.). A recipe may be generated and/or suggestions for altering a recipe may be generated based on the fitness/dietary goals. For instance, actual recipes that a user has utilized may be stored and systems or methods described herein may suggest substitution of ingredients based on the fitness/dietary goals and/or other user preferences.

In an example, an intelligent blending system may include a blender device, a user device, and a scale or measurement device that may be external to or part of the blender device or the user device. The user may interact with the various devices by providing input. In an aspect, the user may enter blending preferences into a user device. The preference may include a level of thickness, texture, a desired temperature, calorie or other dietary levels, and the like of the end product. As the user selects ingredients to add to the blending device, the user may input the type of ingredient and/or status of the ingredient to the user device. Further, the scale may measure a quantity of each ingredient and communicate the quantity to the user device. Based on the input, the user device may determine a blending process to achieve a user's goal or preference. The user device may communicate the blending process to the blending device and the blending device may implement the blending process. It is noted that blending preferences may also be based on predefined preferences, dynamically determined preferences and/or preferences received from other users.

Referring now to FIG. 1, there depicted is an operating environment or functional blending system 100 capable of implementing one or more systems, apparatuses, or processes described above. While shown as separate or distinct components, the components of blending system 100 may be comprised by one or more components. Further, the blending system 100 may include a plurality of blending devices that may be linked together through a network and transceivers. These blending devices may be operatively linked with a server that may operate or otherwise update the plurality of blending devices.

Blending system 100 may generally comprise a user device 102, a blender device 110, a blender container 120, an application program interface (API) 130, a meal kit component 140, a database 142, and a business logic component 132. It is further noted that one or more devices may comprise, at least in part, the various components. For instance, a single component of system 100 may be comprised by one or more devices. Further, the system 100 may include a plurality of blending devices that may be linked together through a network and transceivers. These blending devices may be operatively linked with a server that may operate or otherwise update the plurality of blending devices. It is noted that system 100 may include other devices, such as scales, appliances, or the like.

The user device 102 may include a memory, and processor. The memory may be configured for storing computer executable applications. The processor may facilitate operation of the computer executable components. It is noted that while embodiments described the user device 102 as comprising an app, the app may be comprised of one or more other devices. For instance, portions of the app may be comprised of the user device 102, blender device 110, in a remote device (e.g., a cloud device), or the like.

The user device 102 may communicate with various components of the blending system 100 via a communications interface (e.g., NFC, BLUETOOTH, etc.). In at least one embodiment, user device 102 may include an NFC device that operatively communicates with NFC devices of other components, such as an NFC device of the blender device 110, the blender container 120, or of other components (e.g., a scale, a point-of-sale device, attachments, etc.). As an example, the user device 102 may communicate with the blender container 120 to determine parameters of the container (e.g., make, model, capacity, functionalities, etc.).

In an aspect, the user device 102 may determine or monitor ingredients added or within the blending container 120. For instance, the user device 102 may receive data from the blending container 120 through wired or wireless communication, optical recognition, olfactory recognition, or the like. It is noted that data may be user input in the form of text, voice input, selection of a prompt (e.g., user selecting a check box, etc.), or the like. For example, the user may type "spinach" via an input device (e.g., touch screen, keyboard, etc.) of the user device 102. In another example, the user may speak a term or phrase into a microphone and device 102 may utilize a speech recognition process to determine the identity or other aspects of the ingredient. Further examples allow a user to scroll through a list of ingredients and select a representation of spinach (e.g., textual, graphical, etc.).

In another aspect, user device 102 may include or may communicate with other systems, such as cameras, optical scanning devices, optical scanners, spectrometer, multi-wave length scanner, electronic noses, or the like. Based on input from the other systems, user device 102 may determine an identity of an ingredient. User device 102 may utilize image recognition techniques to identify an image received as input. For example, a user may utilize user device 102 to capture an image of one or more ingredients, such as ingredients disposed in container 120 and/or within meal kit 140. The user device 102 may communicate with the database 142 via the API 130 (e.g., according to instructions 106). It is noted that the API 130 may comprise program or subroutine definitions, protocols, and defined methods of communication between various components of blending system 100.

The database 102 may comprise stored image patterns associated with ingredients. The user device 102 may identify an ingredient based on the image pattern. In another aspect, the user device 102 may upload image patterns to the database 142 and may associate the image patterns with ingredients. The database 142 may store the image patterns as new entries and/or may associate an image pattern with an existing entry.

In another aspect, identified ingredients may be added to a list of ingredients for a current blending process. It is noted that user device 102 may utilize other methods or processes of identifying an ingredient, such as scanning a barcode, label, radio frequency identification (RFID) tag, or other identifier on a product or product packaging, such as marking or tags on the meal kit 140. The prepackaged foodstuff may include at least one of the aforementioned devices to communicate with the user device 102 to identify the contents of the prepackaged foodstuff.

For instance, the user device 102 may scan an identifier comprised by meal kit 140, food packing (e.g., frozen food packaging, boxed food, canned food, or the like) using NFC technology, or an image capturing device (e.g., a barcode reader, camera, etc.). The user device 102 may communicate with the business logic component 132 to add the scanned item to inventory, as described herein. The inventory may be tracked in a cloud-computing device 108.

The user device 102 may recognize the meal kit 140, packaging, or the like and may communicate such to the business logic component 132. Recognizing may include communicating with database 142 to identify an ingredient. The user device 102 may, for example, monitor ingredients added to container 120 for consumption. In at least one embodiment, the user device 102 may determine a quantity associated with an ingredient. The quantity may be based on user input, image recognition, information received from meal kit 140, input from a scale (e.g., which may be a separate device or may be comprised by the user device 102, blending container 120, blender device 110, etc.), or other device. For instance, user device 102 may recognize a gradient mark on blending container 120. In embodiments, a user may override measurement data or other data via an interface of the user device 102. For instance, a user may alter a weight or identity of an ingredient.

It is noted that the scale may be integrated with the blending container 120. The integrated scale may allow a user to add ingredients to the blending container 120 when it is on a counter or on blender device 110. The scale may be integrated within the body of the blending container 120, in a lining of the blending container 120, in a blade assembly, or other portion of the blending container 120. In another aspect, the scale may comprise an attachment to the blending container 120. For instance, a scale may be attached to a base of a blending container 120 or other portion. In one exemplary embodiment, a weight sensor or plurality thereof may be integrated into or attached to an apron or skirt on the bottom of the blending container 120. In one specific embodiment, the weight sensors may be molded into the skirt of the blending container 120 to be operatively positioned to weigh ingredients added to the blending container 120. The weight sensor or sensors may be able to weigh an amount of ingredients added to the blending container 120. The weight sensor or sensors may be able to tare the blending container 120, i.e., deduct the weight of the container from the weight readings to determine the weight of the ingredient or ingredients added to the blending container 120. In another aspect, a user may tare the weight sensors via the user device 102 or via an input device of the container. It is noted that taring may operatively occur automatically or manually (e.g., based on user input). For example, the user device 102 may determine an identity of the container 120 and may retrieve a weight associated with the container 120. In another example, a user may press a button to tare the weight sensor(s).

The scale or weight sensor(s) may be operatively coupled with the user device 102 so as to communicate weights of ingredients added to the blending container 120. In other embodiments, the scale or weight sensor(s) may operatively communicate directly with the blender device 110, which may then communicate with the user device 102.

According to various embodiments, a scale may be integrated into the blending container 120 in a manner that permits the scaled to be calibrated accurately after each use or at other times, is able to tare (i.e., deduct the weight of the container from the weight readings to determine the weight of the ingredient or ingredients added to the blending container 120) and is dishwasher safe. In these and other embodiments, the scale may comprise a force sensor, pressure sensor, load sensor, strain device, or the like. A few exemplary sensors may include a square force-sensitive resistor, a Honeywell FSG, an omnipolar, magnetically activated switch sensor that is hermetically sealed and resistant against moisture. These, however, are merely examples of sensors that may be utilized as the scale.

Further, the sensor or scale may be integrated into the blending container 120 such that it is fully sealed and the blending container 120 remains dishwasher safe and is food safe. This may be accomplished in any manner such as through a sealed chamber in the blending container 120 (such as on the skirt thereof), in a portion overmolded onto the blending container 120, on a separate sealed member attached to the blending container 120 in any appropriate manner, or within a portion of a blade assembly. Sealing of the sensor or scale prevents moisture entering therein while allowing the sensor or scale to remain sensitive to determine and record the appropriate weights.

Further still, a water-resistant or water-proof scale or sensor may be utilized. In these embodiments, the water-resistant or water-proof scale may be operatively connected with the blending container 120 so that the blending container 120 may operatively act as a scale while remaining dishwasher and food safe. The scale and/or sensor can remain operational despite water coming into contact therewith.

The scale may be configured to calibrate itself or be calibrated by a user device 102 (or other component of system 100, such as blender device 110) after each use of the blending container 120 on the blending device 110. During blending, the blending container 120 is subjected to vibration. The scale and/or sensors are configured to withstand this vibration and then calibrate to zero once the blending container 120 is emptied. This will allow a user to add ingredients to the blending container 120 again and measure the weight of the ingredient being added. The scale may be configured to communicate with user device 102 such that when a first recipe is done, the scale automatically recalibrates back to zero.

Further, the scale may be able to withstand the vibration that occurs to the blending container 120 during operation of the blender device 110. The scale may be attached or integrated with the blending container 120 such that the vibrations do not affect the efficacy of the scale. The scale may include mechanical attachment devices, such as a biasing portion that allows the scale to remain at an operative position despite the vibrations. Further, the scale may include software that accounts for the vibrations that occur during operation to accurately weigh ingredients being added to the blending container 120. It should be understood that these are merely examples of mechanism to account for the vibrations. However, the present disclosure contemplates any appropriate configuration or method.

In at least one embodiment, the system 100 may test or evaluate the efficacy of the scale. For example, a user may place an amount of a particular ingredient (e.g., water) into the blending container 120. The user device 102 may determine the quantity of water based on scanning the blending container 120 (e.g., via an optical scanner) or user input. For an ingredient with a known weight per volume, the user device 102 may compare the sensor(s) reading to an expected weight. In an aspect, the user device 102 may determine a degree of accuracy, diagnose issues, adjust the sensor(s), or calibrate the sensor(s).

As ingredients are added, the user device 102 may communicate with the cloud-computing device 108 to update inventory. In another aspect, the business logic component 132 may automatically decrement inventory stored in the cloud computing device 108 (and/or stored on the user device 106) as products are scanned or blended.

Business logic component 132 may assist a user in managing inventory, appliances, or the like. For instance, the business logic component 132 may monitor inventory and may replenish items as they are utilized. In an example, the business logic component 132 may determine when inventory of an item falls below a threshold that may be automatically set or set by a user. When the inventory falls below the threshold, the business logic component 132 may automatically order the item for the user, may prompt a user for an order, or otherwise generate an alert to a user to identify the inventory.

In another aspect, the user device 102 may receive information associated with the blender device 110, container 120, or the like. In an example, the user device 102 may communicate with NFC components of the blender device 110 or container 120. The NFC component may provide identifying information, such as a make, model, ID, or other data. In another aspect, the user device 102 may capture an image of the blender device 110 or container 120. It is noted that the user device 102 may scan or identify other components, such as attachments, accessories, or the like. It is noted that the user device 102 may utilize NFC or other wireless devices to communicate with various items.

According to at least some embodiments, the container 120, the blender base 110 or other components may not include an NFC tag or other wireless technology. As such, user device 102 may capture images (e.g., still or moving) to facilitate determining the identity of such components. As an example, the user device 102 may include a camera that captures an image of the component. The user device 102 may communicate with the database 142. The database 142 may comprise a library of stored image patterns. The business logic component 132 may identify matches or likely matches to the captured image from image patterns stored in the image database. The business logic component 132 may return the matches or likely matches to the user device 102. The user device 102 may render results of the matching via an interface device (e.g., camera, speaker, etc.). The user device 102 may prompt a user to identify whether a match is correct and/or select a match from a set of likely matches. If a user identifies that the component is not listed in the match or set of matches, the user device 102 may ask the user to capture the item again and/or may instruct the business logic component 132 to select other possible matches.

Once a user has confirmed the component with the matches produced by the business logic component 132, the business logic component 132 may set the identity of the component or "context" for the app on the user device 102. Context can mean content, recipes, features and functionalities, compatible devices, cross-sell/up-sell opportunities, or the like.

In at least one aspect, the user device 102 may register a matched component with an account associated with the user device 102 and/or a user account. For instance, the user device 102 may automatically register the matched component to a user's account. In another example, the user device 102 may prompt a user for input to register a component. It is noted that the registration process may be mandatory or optional.

User device 102 (e.g., via the app) may orchestrate food preparation via one or more user interfaces. In an aspect, the user device 102 may generate instructions for food preparation based on a user selected blending program, automatically determined blending program based on context of ingredients, or the like. In at least one aspect, the user device 102 may identify a blending program based on an identity of the meal kit 140 and/or instructions received from the meal kit 140, such as through an NFC device.

In an aspect, the instructions for food preparation may include instructions that prompt user action, instruct appliances to perform a process, and the like. It is further noted that user device 102 may send instructions to appliances, such as an oven or blender device 110. In an example, the user device 102 may instruct an oven to preheat or begin heating. In another aspect, the user device 102 may set parameters for the blender device 110. For instance, the user device 102 may generate a blending process comprising instructions (e.g., power settings, blade speeds, blending patterns, timing information, etc.).

It is noted that instructions may be based on attributes associated with content to be blended (e.g., quantities, statuses, characteristics, ratios, etc.), identities of blender devices, containers, appliances, or other context. Moreover, a user may provide input and/or user device 102 may identify user preferences associated with a user account. Such preferences may include desired consistency, temperature, color preferences, caloric preferences, quantity preferences, power usage preferences, or the like.

Figure 2:
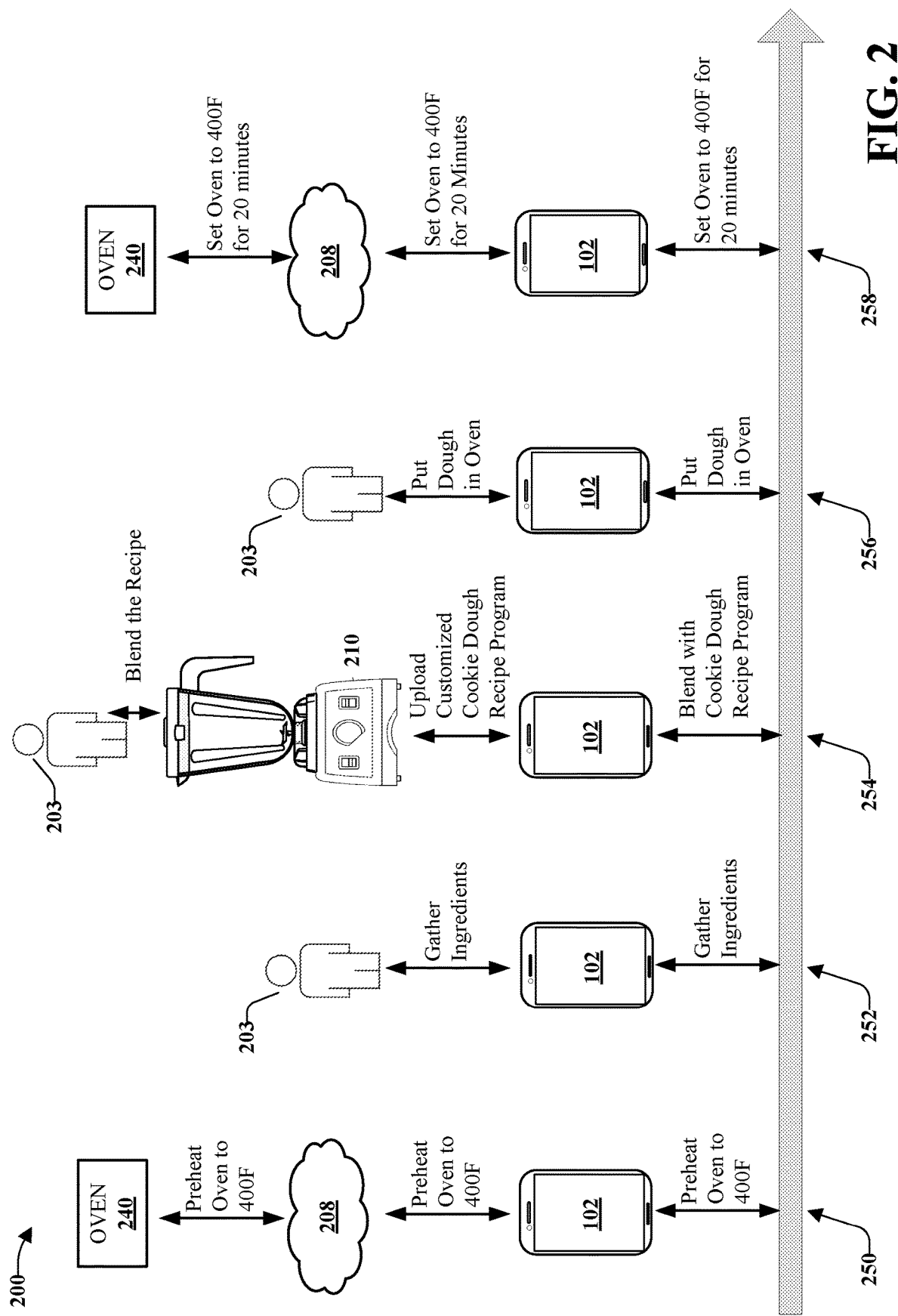
FIG. 2 is an exemplary workflow diagram of a cooking procedure in accordance with various disclosed embodiments in accordance with various embodiments described herein.

Turning now to FIG. 2, with reference to FIG. 1, there is an exemplary workflow diagram 200 of a cooking procedure in accordance with various disclosed embodiments. In this example, a user 208 selects to execute a recipe for cookie dough via user device 102. While the cooking procedure or method is shown and described as comprising actions at particular times, it is noted that different recipes may comprise different actions or procedures that may occur at different times. Moreover, various actions may be completed by one or more of users, mechanical machines, automated assembly machines (e.g., including one or more processors or computing devices), or the like.

At time 250, user device 102 may generate an instruction that is communicated to appliance 240 through communications network 208. For instance, the user may select to execute a cookie recipe via the user device. It is noted that the user may use a touch screen, microphone, image scanner (e.g., scanning a QR code on a meal kit), or otherwise provide input to select the recipe.

User device 102 may (e.g., via business logic 132) generate instructions associated with the cookie recipe. The user device 102 may instruct appliance 240 to preheat. It is noted that while appliance 240 is described as an oven, user device 102 may communicate with various other appliances. In another aspect, the user device 102 may generate an instruction via a user interface, and the user 203 may set a temperature for the appliance 240.

At 252, the user device 102 may instruct the user 203 to gather ingredients. It is noted that the user device 102 may instruct the user 203 to gather specific quantities of ingredients. When the user 203 gathers ingredients, the user device 102 may scan the ingredients to determine whether the user has gathered the appropriate ingredients in the appropriate quantities. In an aspect, the user device 102 may generate notifications to the user 203 if the user has not gathered the appropriate ingredients or quantities. In another aspect, the user 203 may gather additional, alternative, or custom ingredients according to the user's preference.

In at least one example, the user device 102 may provide suggestions on substitute ingredients. For instance, the user device 102 may recommend substitution of sugar with other sweeteners (e.g., honey, dates, etc.) The recommendation may include appropriate quantities. According to another aspect, the user device 102 may generate recommendations based on dietary goals, user preferences, a user's inventory, or the like.

At 254, the user device 102 may generate instructions for the user to place ingredients into a blending container. The instructions may include a step-by-step guide that identifies an order of ingredients to be added to the blending container. In at least one aspect, user device 102 may communicate with a measuring device to determine an amount of each ingredient added or to be added to the container. For instance, the user 203 may place ingredients on a scale and the user device 102 may communicate with the scale to determine a quantity. It is noted that a blender base may include a scale, a blending container may include a scale, or the container (or base) may be positioned on a scale. In another aspect, the user device 102 may comprise a scale, which may include pressure sensors.

The user device 102 may generate a customized blending process based on the ingredients, quantities, blender device, blending container, or other context set by the user device 102. The user device 102 may communicate the blending process to the blending device 210. In another aspect, the user device 102 may generate instructions to be performed by a user 203. The instructions for the user may include tips on blending, such as speeds, tamper use, pulse blending, use of a spatula, or the like.

At 256, all ingredients have been blended into cookie dough. The user device 102 may prompt the user 203 to prepare the cookie dough for baking. For instance, the user device 102 may instruct a user to place the cookie dough on a baking sheet and place the dough in the oven 240. In at least one aspect, the user device 102 may generate tips or tricks to prepare the blended dough. For instance, the user device 102 may instruct the user on spacing of the dough, size of the dough, whether to use a cooking spray or parchment paper, and the like. In an aspect, the user device 102 may generate the tips or tricks based on the context of the ingredients. For instance, certain cookie doughs may require different spacing or the like.

The user 203 may utilize the user device 102 to scan the prepared foodstuff to determine whether the user 203 has performed instructions according to recommendations. For instance, the user device 203 may scan dough placed on the cookie sheet. The user device 203 may capture an image of the dough and cookie sheet and may determine whether the user should adjust the placement and/or size of the dough.

At 258, the user device 102 may instruct the appliance 240 to perform an operation according to the recipe. In this example, the user device 102 communicates with the appliance 240 to ensure the appliance is heated to the appropriate temperature and may set parameters for operation of the appliance 240 (e.g., bake at a certain temperature for a certain duration of time. As described herein, user device 102 may additionally or alternatively prompt the user 203 to set the appliance parameters.

In embodiments, the user device 102 may adjust instructions to a user, blending device 210, appliance 240, or the like. For instance, user device 102 may adjust instructions during a blending process and/or food preparation process. The user device 102 may generate adjustments based on, for example, desired blend consistencies, ingredients, state of ingredients (e.g., frozen, raw, hot, canned, fresh, chopped, etc.), or the like. In an example, the user device 102 may generate adjustments based on a lookup table in a database, an algorithm, machine learning, or the like.

In another aspect, user device 102 may generate adjustments based on monitoring parameters of blending. For instance, blending system 100 may include one or more sensors 104. Sensors 104 may include temperature sensors (e.g., thermometers, thermocouples, etc.), motion sensors (e.g., gyroscopes, accelerometers, etc.), pressure sensors, optical sensors, current or voltage sensors, engine sensors, or the like. It is noted that various components of blending system 100 may include sensors 104. In an example, the container 120 may include any kind of sensor that may sense or detect any aspect of the ingredients add, the blending process (including time, speed of material within the container, viscosity of the material, opaqueness of the material, etc.). The sensor may be integrated into or otherwise attached with the container.

Sensors 104 may gather telemetry data and may communicate the data to various components of the blending system 100. For instances, sensors may communicate with the user device 102 via wireless (e.g., NFC) or wired communications. In another aspect, sensors may communicate with a database or network device through cloud 108.

According to embodiments, user device 102 may communicate telemetry data to API 130 via a communications network. Business logic component 132 may perform diagnostics to compare the telemetry data to store data associated with the blender performances. In an aspect, the business logic component 132 may communicate adjustments to the user device 102. The user device 102 may generate instructions based on the adjustment.

In another aspect, the business logic component 132 may determine likelihoods or probabilities associated with an issue occurring and may communicate the likelihood to the user device 102. The user device 102 may make adjustments or generate instructions based on the likelihood of the issue.

In an aspect, blending system 100 (e.g., via user device 102, business logic 132, database 142, or other components of system 100) may utilize artificial intelligence, statistical models, or other processes and/or algorithms. In embodiments, system 100 may utilize classifiers that map an attribute vector to a confidence that the attribute belongs to a class. For instance, system 100 may input attribute vector, $x=(x1, x2, x3, x4, xn)$ mapped to $f(x)=confidence(class)$. Such classification can employ a probabilistic and/or statistical based analysis (e.g., factoring into the analysis affinities and ingredient attributes) to infer an action that a user desires to be automatically performed, adjustments to be made, image recognition, ingredient quantities, or the like. In various embodiments, system 100 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as cameras, optical scanning devices, optical scanners, spectrometer, multi-wave length scanner, electronic noses, or the like.

In accordance with various aspects of the subject specification, an example embodiment may employ classifiers that are explicitly trained (e.g., via a generic training data) as well as implicitly trained (e.g., via observing user behavior, blending information, user preferences, historical information, receiving extrinsic information). For example, support vector machines may be configured via learning or training phase within a classifier constructor and feature selection module. Thus, the classifier(s) may be used to automatically learn and perform a number of functions, including but not limited to determining identities of ingredients or devices, states and/or quantities of ingredients, additional ingredients to add to meet user preferences, blending processes associated with functions of a blender motor, suggested recipes, target goals for dietary or fitness needs, and the like. This learning may be on an individual basis, i.e., based solely on a single user, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user.

User device 102 and/or business logic component 132 may monitor blending activity, dietary information, and final blended products associated with a user. For instance, user device 102 may monitor a history of what ingredients were blended, how often a user blends contents, and the like. Furthermore, user device 102 may include and/or communicate with other fitness or dietary systems including those from third parties. In an example, user device 102 may be comprised within a wearable device, such as a smart watch. In such an instance, user device 102 may monitor a user's activity (e.g., walking, running, exercise, etc.).

In another aspect, user device 102 may receive input from dietary or fitness systems. The input may include exercise information, information about other consumed food or drinks, and the like. The dietary or fitness systems may be any dietary or fitness system capable of communicating via a wireless or wired connection. Such dietary or fitness system may include a wearable device, a Wi-Fi connected fitness device (e.g., treadmill, gaming counsel, etc.), a gaming device (e.g., a fitness game or program on a gaming device), a computer, laptop, smartphone, tablet or the like.

In embodiments, user device 102 may receive user provided input. User input may include information manually entered by a user, such as a user's exercise history, meals, calorie intake, and the like. Furthermore, user input may include user defined goals or dietary thresholds. Goals may include dietary thresholds or fitness goals. Fitness goals may include, for example, altering weight (e.g., weight loss or weight gain), increasing muscle mass, caloric intakes, and the like. Dietary thresholds may include levels associated with intake of calories, sodium, fat, vitamins, or the like.

In another aspect, user device 102 may utilize information from various other components to generate suggestions associated with goals and/or thresholds. For instance, user device 102 may suggest alterations (e.g., substituting ingredients) in recipes to reduce caloric intake. In another example, user device 102 may generate information associated with an amount of exercise needed to burn off or utilize calories from blended ingredients. The suggestion may include a type(s) of exercise based on user's preferences or history. For example, if a user has an affinity to jogging, then user device 102 may generate a suggestion indicating an amount of jogging (e.g., distance and/or time) needed to burn off the calories in the blended ingredients.

Moreover, user device 102 may communicate with other systems or devices. For instance, user device 102 may transmit output to an external system. The output may include dietary goals, blending history, and the like. In another aspect, output may include data instructing a display device to output a graphical user interface as described in more detail herein.

In at least one embodiment, user device 102 and other components of system 100 may receive data from one or more server devices or other network devices. The data may comprise update data for updating software, updating dietary information associated with ingredients or potential ingredients, data generated by other users (e.g., user created recipes, friend requests, etc.), or the like. In some embodiments, user device 102 may store (e.g., locally or in cloud memory) dietary information associated with ingredients or may receive the dietary information from a remote storage device (e.g., a database).

In an aspect, receiving updated data may comprise downloading and running a software application. The software application may be capable of connecting to a network, such as the Internet. The software application may be capable of accessing step-by-step recipes or blending programs from a remote database or website, such as www.vitamix.com, and downloading the recipes or programs to the wireless device.

In another aspect, user device 102 or other components of system 100 (e.g., business logic component 132) may identify content for users to purchase For instance, user device 102 may identify content to be purchased based on contextual analysis of a user's preferences, food items in inventory, ingredients blended, recipes blended, container 120, blender device 110, attachments, accessories associated with a user profile, appliances, or other equipment associated with a user. The content may include compatible containers, attachments, accessories, cookbooks, food items (e.g., ingredients, meal kits, frozen meal packs), or the like. In another aspect, user device 102 may connect to a user's social media account(s) and may suggest other accounts for a user to follow. For instance, user device 102 may perform contextual analysis and may identify an account of a store, physical fitness profile, or the like for a user to follow.

According to another aspect, user device 102 may perform contextual analysis and suggest products, colors of products or the like based on a user's kitchen. For example, the user device 102 may capture an image of a kitchen. The image may include images of counter tops, appliances, or the like. The user device 102 or other component of system 100 (e.g., business logic component 132) may suggest a color shell for a blender device 110 that may match a user's kitchen. As another example, the user device 102 may determine dimensions of a kitchen, such as space between a counter top and a cabinet. The user device 102 may identify whether a particular blender device 110 will fit the dimensions and may provide the user with recommended blender devices based on the fit.

It is noted that the user device 102 may generate a rendering of a blending device, attachment, or other content overlaid an image of the user's kitchen. This may allow a user to visualize a blender device in their kitchen prior to purchasing the device.

Figure 3:
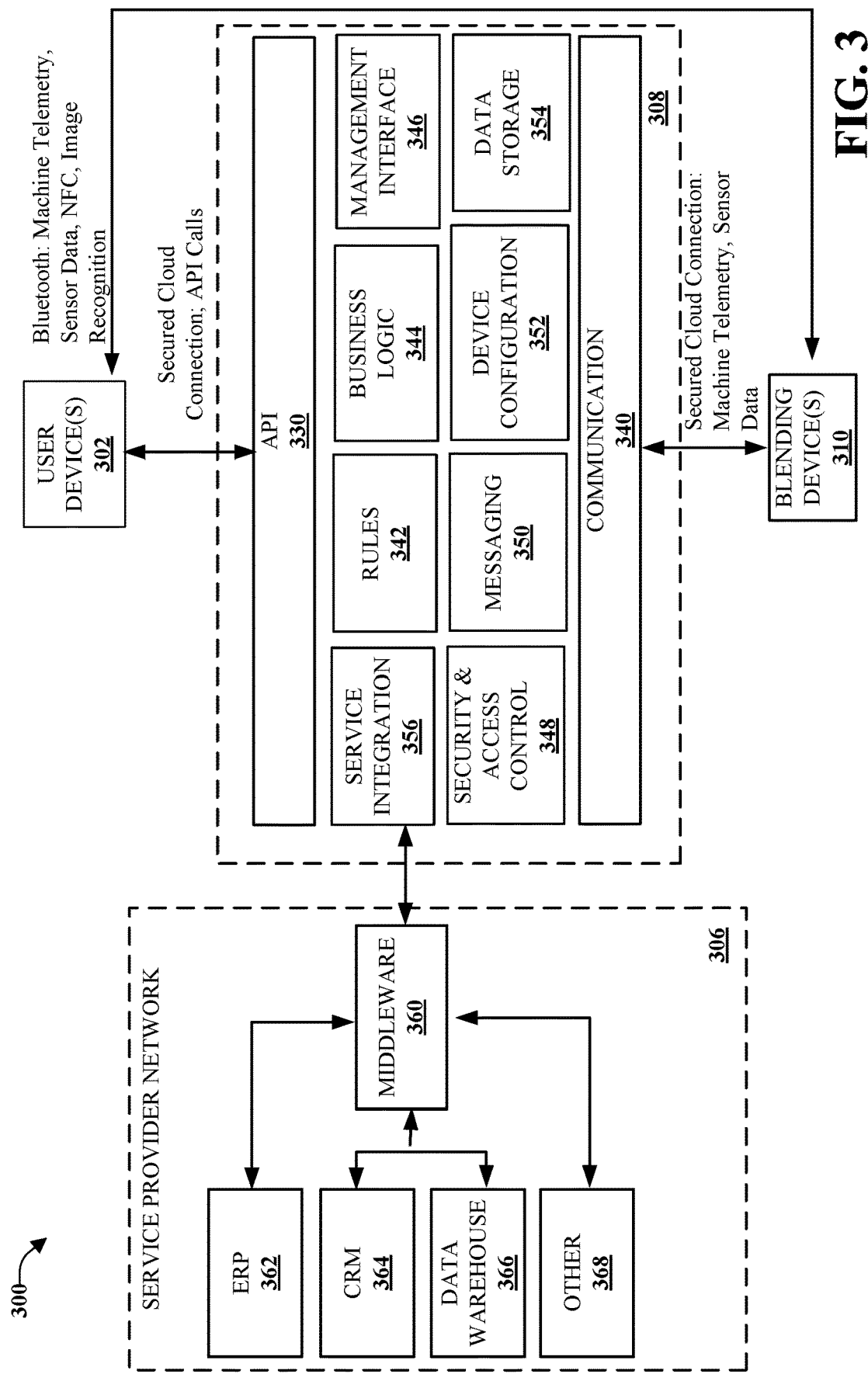
FIG. 3 is an exemplary smart kitchen system in accordance with various embodiments described herein.

Turning now to FIG. 3, there is an exemplary smart kitchen system 300 in accordance with various disclosed aspects. It is noted that the system 300 may include various aspects described with reference to the other figures of this disclosure. System 300 primarily includes user device 302, blending device 310, remote server device 308, and service provider network 306.

The blending device 310 may include telemetry sensors, such as temperature sensors (e.g., thermometers, thermocouples, etc.), motion sensors (e.g., gyroscopes, accelerometers, etc.), pressure sensors, optical sensors (e.g., cameras, etc.), current or voltage sensors, engine sensors, or the like. In another aspect, the blending device 310 may include wireless communication devices that may communicate with a user device 302 or a remote server device 308, which may be a cloud-computing device.

User device 302 may include a program or user application that may receive information from blending device 310, send information to blending device 310, receive information from an API 330 of remote server device 308, or send information to a remote server device 308 through the API 330. In an aspect, the API 330 may be configured to provide a communication protocol that may be extensible and may provide a structured interface for various software programs or applications. The protocol may define routines, data structures, objects, variables, and the like for communication by and between the user device 302 and the remote server device 308.

In at least one embodiment, a device communication component 340 may provide for direct communication between the blending device 310 and the remote server device 308. This communication component 340 may define a separate protocol defining routines, data structures, objects, variables, and the like for communication other than through the user device 302. For instance, some user may not have a user device 302 or may select not to use a user device 302 for a given blending process. Thus, the blending device 310 may directly communicate with the remote server device 308. In at least one embodiment, the blending device 310 communications with both the user device 302 and the remote server device 308.

The remote server device 308 may include various components such as a rules component 342 (which may define rules for communications), business logic component 344 (which may provide statistical analysis, accounting services, or the like), a security component 348 (which may selectively deny or allow a user device 302 or blending device 308 access to data or services), a messaging component 350 (which may control messages sent to user device 302, blending device 310, or other devices), and a device configuration component 352 (which may identify how a blending device 310 is configured). In another aspect, the remote server device 308 may include a management interface component 346 that allows for access and maintenance of the remote server device 308. Moreover, the remote server device 308 may store information in data storage component 354.

Remote server device 308 may include a server integration component 356 that allows for communications with existing systems or custom design systems. It is noted that the server integration component 356 may communicate with the service provider network 306 via middle ware component 360.

Service provider network 306 may include middleware component 360 that allows for communication between the service provider network 306 and the remote server device 308. In an aspect, the middleware component 306 may comprise an on-premises middleware program that selectively grants remote server device 308 access to back-end data or services from service provider network 306. This distribution of resources may allow for more efficient access to back-end resources. For instance, the service provider network 306 may allow for additional processing while remote server device 308 is communicating with various user devices 302 or blending devices 310. In another aspect, middleware component 360 may secure access to back-end resources.

In some embodiments, service provider network 306 may include data warehouse 366 for back-end data, enterprise resource planning (ERP) system 362 customer relationship management (CRM) application 364, and other resources 368. Middleware 360 may allow for communication between these components within the service provider network 306 and communication between these components and remote server device 308.

Figure 4:
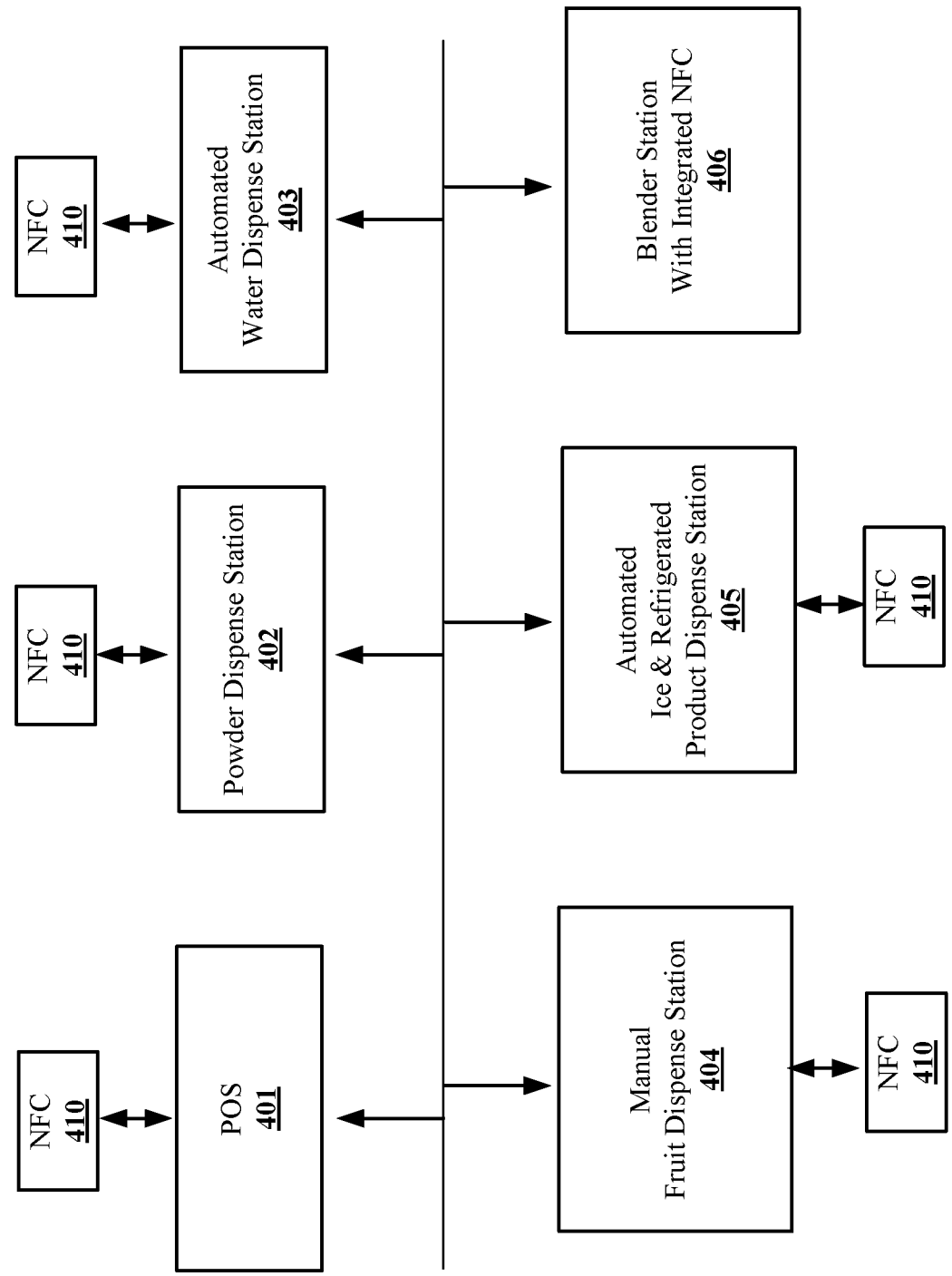
FIG. 4 is an environmental view of exemplary commercial kitchen system in accordance with various embodiments described herein.

FIG. 4 illustrates an exemplary commercial kitchen system 400 in accordance with aspects disclosed herein. It is noted that system 400 may include various aspects described with reference to the other figures of this disclosure. For instance, system 400 may include the blender device 110 and/or aspects described with reference to user device 102.

Commercial food businesses that make recipe-based beverages struggle to have consistency in their product. This may be caused by a number of factors including incorrect ingredients, incorrect order of the ingredients, incorrect amounts of a given ingredient, and potentially incorrect processing of the ingredients.

Commercial kitchens must rely on proper training and well-defined procedures to meet consistency requirements and manage time constraints. Such commercial kitchens may be subject to increasing numbers of product offerings, and these establishments frequently have a constant turnover of employees. These issues make consistency in how a specific product is made even more challenging. Color-coded measuring scoops and custom-printed instructions for a given order are implemented in some commercial kitchens to try to achieve the desired consistency in their products.

System 400 may utilize containers 120, blender device 110, and various stations deployed at preparation stations to ensure compliance in how a product is made. The stations may include programmable logic controllers, displays, interfaces, sensors, and other mechanical and electrical devices as described herein.

For instance, system 400 may include an order-entry/POS station 401 (which may receive an order), power dispense station 402 (which may dispense power), (water dispense station 403 (which may manually or automatically dispense water or other liquids), fruit dispense station 404 (which may manually or automatically dispense fruit or other foodstuff), ice and refrigerated product dispense station 405 (which may dispense temperature controlled foodstuff), and blender station 406 (which may blend foodstuff). It is noted that various stations may include a user device (e.g., tablets, cellular phones, set-top computer devices, or the like), appliances, or the like. In another aspect, the stations may include communication devices such as NFC device(s) 410. The NFC devices 410, for instance, may communicate with an NFC device of a container (e.g., container 120).

In an example, an employee may receive an order form a user and may enter the order in POS station 401. It is noted that a user may enter the order and/or may provide the order through a user device. The POS station 401 may utilize NFC device 410 to read an ID of a blending container that may be stored in an NFC device of a container. The POS station 401 may associate the ID of the container with the order, such a specific drink to be made. It is noted that the POS station 401 may communicate the ID and order to a network device and/or may write the order to the NFC device of the container. As the container is passed to each station, the NFC devices 410 of each container may be used to:

provide station-specific instruction to the operator for the drink to be made in the presented container, automatically process a specific portion of the recipe process, such as blending at a specific blend profile or adding the correct amount of ice, water or other liquid ingredient, prohibit a specific operation if that process is not used in the recipe. For example, if water is not present in the recipe, then the water dispense station can be automatically disabled when the container for that order is presented to the water dispense station, prohibit a specific operation if the recipe requires a specific sequence of preparation stations and the container is out-of-sequence or not at the proper station, such as prohibiting the blending operation until all ingredients have been dispensed, automatically capture metrics for the amount of time a container is at each station for a specific recipe, automatically capture metrics for the amount of time a specific recipe takes to be made from order to final pour.

Figure 5:
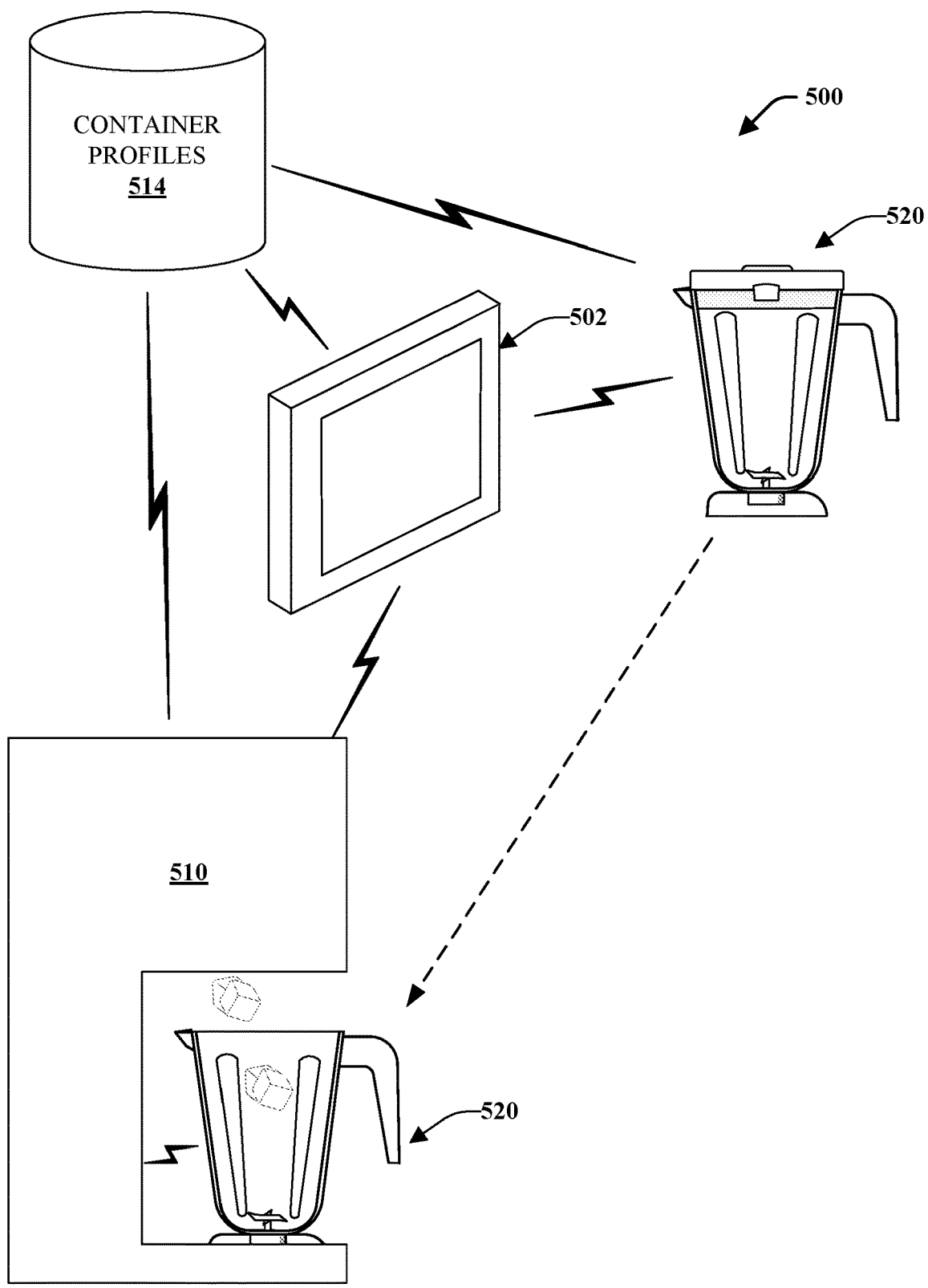
FIG. 5 is an exemplary blending system for ordering and preparation of products in accordance with various embodiments described herein.
Figure 6:
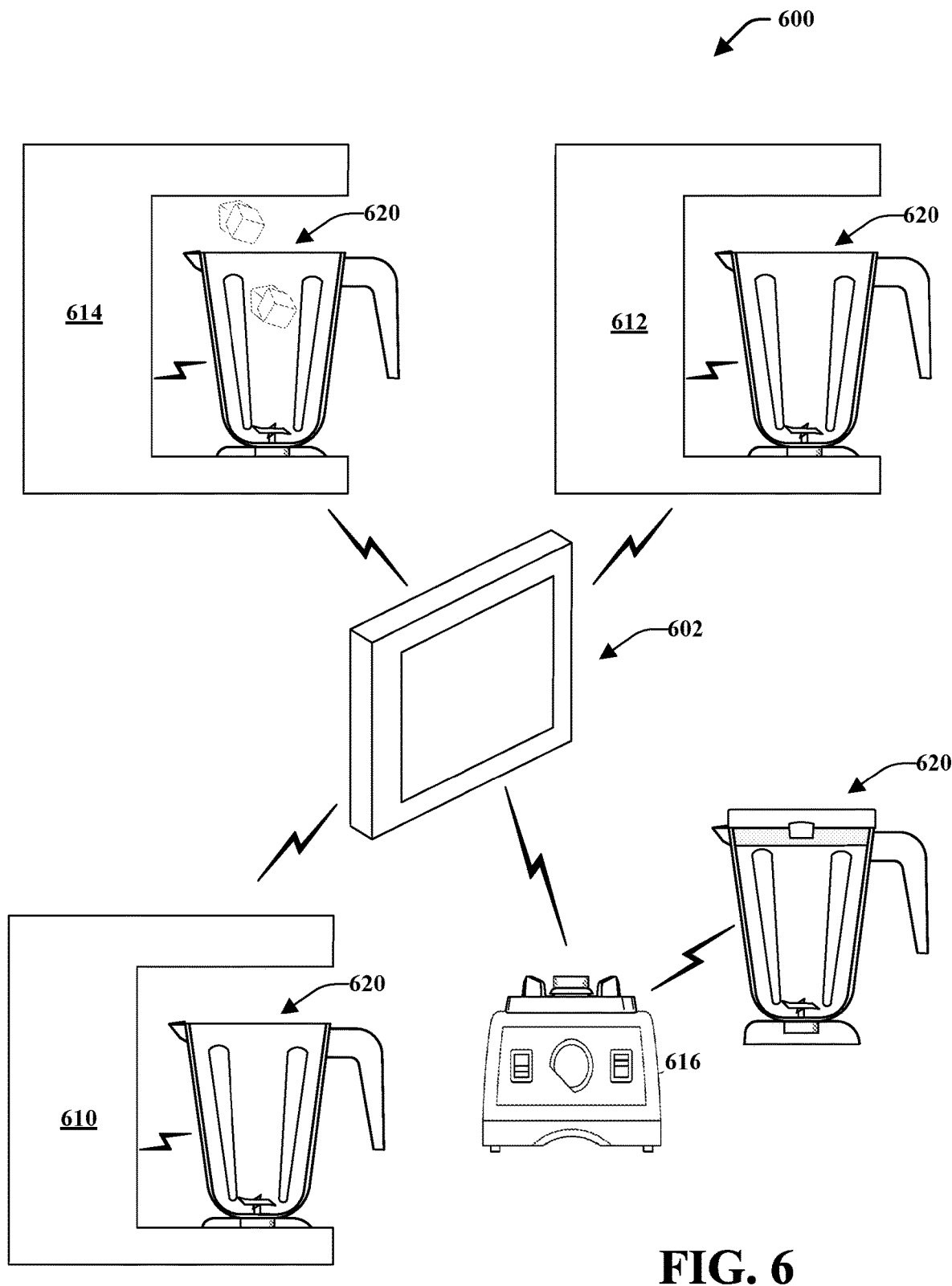
FIG. 6 continues the ordering and preparation procedure of FIG. 5 in accordance with various embodiments described herein.

FIGS. 5-7 illustrate exemplary systems along with ordering and preparation procedures. In an aspect, procedure may include a recipe comprising instructions to be executed at each station for a particular recipe. FIG. 7 illustrates an exemplary recipe and preparation procedure 700. It is noted that the aspects of FIGS. 5-7 may be utilized with components or systems described with reference to various other figures.

A commercial smart system 500 may include a point of sale system 502 that may receive payment and orders. The point of sale system 502 may include user interfaces as described herein. In an aspect, the point of sale system 502 may include memory or be communicatively coupled to a database 514 that stores available products, profiles for blending devices, profiles for blending containers, user profiles, or the like.

In an example, a user may enter an order into the point of sale system 502 via a touch screen, by sending an order through a user device (e.g., via a mobile application), or the like. The order may container a blended product that is associated with a recipe. The point of sale system 502 may then associate a specific blender container 520 with the order. For example, a commercial kitchen may comprise several different blender containers. This allows the kitchen to make multiple products at the same time. The container 520 may be scanned by the point of sale system 502 to provide an ID of the container. Scanning may include using an image scanner (e.g., barcode scanner, camera, etc.), an NFC device, or other device to retrieve information from the container. It is noted that the ID may be directly received from a memory device of a container 520 or may be retrieved from a memory device of the point of sale system 502 or the database 514. The point of sale system 502 may retrieve a historic profile for the container or may create a new profile for the container if one does not exist. In an example, a container profile may include various parameters associated with the container, such as a make, model, use history, ID, whether the container has been utilized for recipes containing allergens, or the like.

After selection of the container, a user may bring the container 520 to various stations, such as described in FIG. 4. The stations (e.g., exemplary station 510) may detect the container 502 and may determine an ID of the container 502. Each station 510 may, for example: confirm the container is associated with an active order; confirm the station is the active station for the container's active order; gather the station-specific parameters for the active order; if semi-automatic, enable the station operation once confirmed by the operator; if automatic, enable the station operation after a brief delay of container detection; and if a manual station, present the operator with instructions of specific steps at this station for this particular order.

It is noted that the station 510 may communicate with one or more of the container 520, the point of sale system 502, or the database 514. For instance, the container 520 may comprise a memory and a wireless communication device, such as an NFC tag. The memory may store information regarding a current order associated with the container 520. The information may include, for example, a type of order, identification of ingredients, stage of order preparation, etc. The station 510 may read this information from the container 520 and may update the status of the order after completion of a specific task, such as dispensing an amount of an ingredient.

In other examples, the station 510 may communicate with the point of sale system 502 or the database 514 to retrieve order information and update a status of an order association with the container 520. Moreover, the container 520, the point of sale system 502, or the database 514, may each include order information that may be read and updated. This may act as a redundancy check or back-up should any one component become out of sync.

Turning to FIGS. 6-7, there are various exemplary stations for a commercial kitchen system 600 where a point of sale system 602 is a centralized station for coordinating execution of a recipe via one or more of the stations. The stations may include a water dispensing station 610, a dry goods dispensing station 612, an ice dispensing station 614, and a blender station 616. The point of sale system 602 and the stations 610-116 may each include wireless or wired communication devices as described herein. It is noted that the commercial kitchen system 600 may include various other stations, such as a produce station, frozen goods (e.g., frozen yogurt, ice cream, etc.) station, or the like. Commercial kitchen users may add, remove, or utilize other stations according to their needs.

The point of sale system 602 may associate container 620 with a particular order. The order may include a recipe and preparation procedure 700. The procedure 700 may identify ingredients to be added at each station, operations to be executed at each station, an order defining which stations to should be visited and the like. The point of sale system 602 identifies container 620 as described herein and associations the container 620 with the procedure 700. The point of sale system 602 may send to each station 610-116 all or part of the procedure 700. For example, the point of sale system 602 may send to each station only the ingredients or operations for that station, or may send an entire recipe to the station. In another aspect, the point of sale system 602 detects and stores an ID of the container and links the procedure 700 with the ID, which is then stored in the point of sale system 602.

As a user moves the container 620 to stations, the point of sale system 602 may monitor the procedure 700's progress. For instance the point of sale system 602 may determine expected wait time for a recipe to be completed, whether the user has placed the container at a wrong station (e.g., a station not identified by the procedure 700 or a station that is out of order), whether operations have been completed successfully or whether there is a failure, and the like.

In an example, the water dispensing station 610 may then monitor for or detect the container 620 and may determine the container ID. The water dispensing station 610 may verify whether it has received instructions for the container 620 from the point of sale system 602. If it has not received instructions for the container 620, it may query the point of sale system 602 for a recipe associated with the container 620. If no recipe is found, the user may return the container 620 to the point of sale system 602. If a recipe is found, the point of sale system 602 may send or resent instructions to the water dispensing station 610. It is noted that the various other stations may monitor, detect, or determine the container 620 or container ID. Moreover, the various other stations may similarly receive instructions for their specific operations or ingredients.

The water dispensing station 610 may receive instructions regarding an amount of water or other fluid to add to the container 620. The instructions may be sent by the point of sale system 602. The amount may be specified by volume, weight, a flowmeter counter, or the like. The water dispensing station 610 my include a manual or automatic water dispensing device. For instance, a manual dispensing device may require a user to initiate a dispensing process by activating a solenoid, opening a valve, or the like. The user may be required to terminate the dispensing and/or the dispensing may terminate automatically based on monitoring of a flow meter or a weight change of the container. In a fully automatic system, the water dispensing station 610 may determine whether the container 620 is positioned to receive water from an outlet and may automatically start and end dispensing.

The various other stations may similarly dispense ingredients. For instance, the dry goods dispensing station 612 may include a stepper motor to dispense dry goods. As another example, ice dispensing station 614 may dispense ice as cubes or as shaved ice via an ice shaving motor. The various motors may be manually or automatically activated. According to some embodiments, the stations 610-616 automatically turn off or deactivate their respective motors if they detect that the container 620 has been removed from the station. Moreover, blender station 616 may turn off its motor if the container 620 does not include a lid.

It is further noted that the stations may require a user to manually add ingredients to the container 620. Such stations may comprise user interfaces that a user interacts with to view instructions. The interfaces may allow the user to provide an indication of when the actions are complete. In some embodiments, the stations may include weight scales, optical recognition devices, or other devices that can detect addition of ingredients to the container 620 and may automatically alert a user when the proper amount of an ingredient has been added. Moreover the station may alert a user when an improper ingredient or improper amount (e.g., too much, too little, etc.) of an ingredient has been added.

In at least some embodiments, the stations 610-616 may report a status to the point of sale system 602. An exemplary status may identify whether actions were successfully performed, not successfully performed, whether or what type of an error occurred (e.g., out of ingredients, dispenser malfunctioning, etc.), or the like. As an example, the water dispensing station 610 may send the point of sale system an indication that liquid has been dispensed without error. The point of sale system 602 may determine that the operations for the water dispensing station 610 are complete and may determine the next station to which the container 620 should be taken for a given recipe. The various other stations may similarly send status information to the point of sale system 602 and the point of sale system 602 may determine a next station or step for a user to perform.

Moreover, the point of sale system 602 may determine whether a user has taken the container 620 to a wrong station or has taken the container 620 to a wrong order of stations. The point of sale system 602 may generate an alert on an interface or may send an alert to the station at which the container 620 is located or to the container 620 itself. As such, the container 620 or the station (e.g., stations 610-16) may alert the user that the container 620 is at the wrong station and may indicate to which station the container 620 should be delivered.

Figure 8:
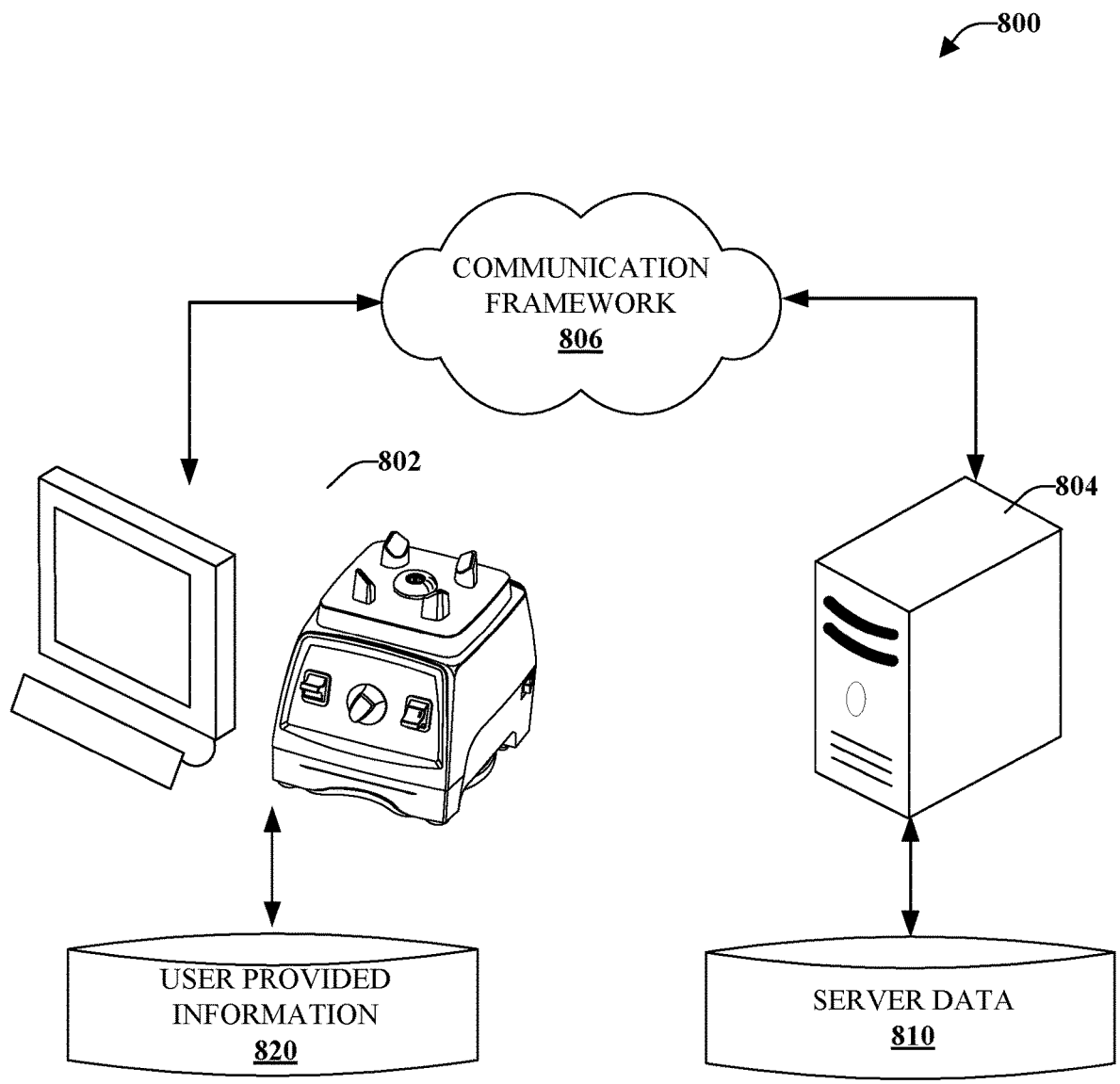
FIG. 8 is an environmental diagram of an exemplary communication system in accordance with various embodiments disclosed herein.
Figure 9:
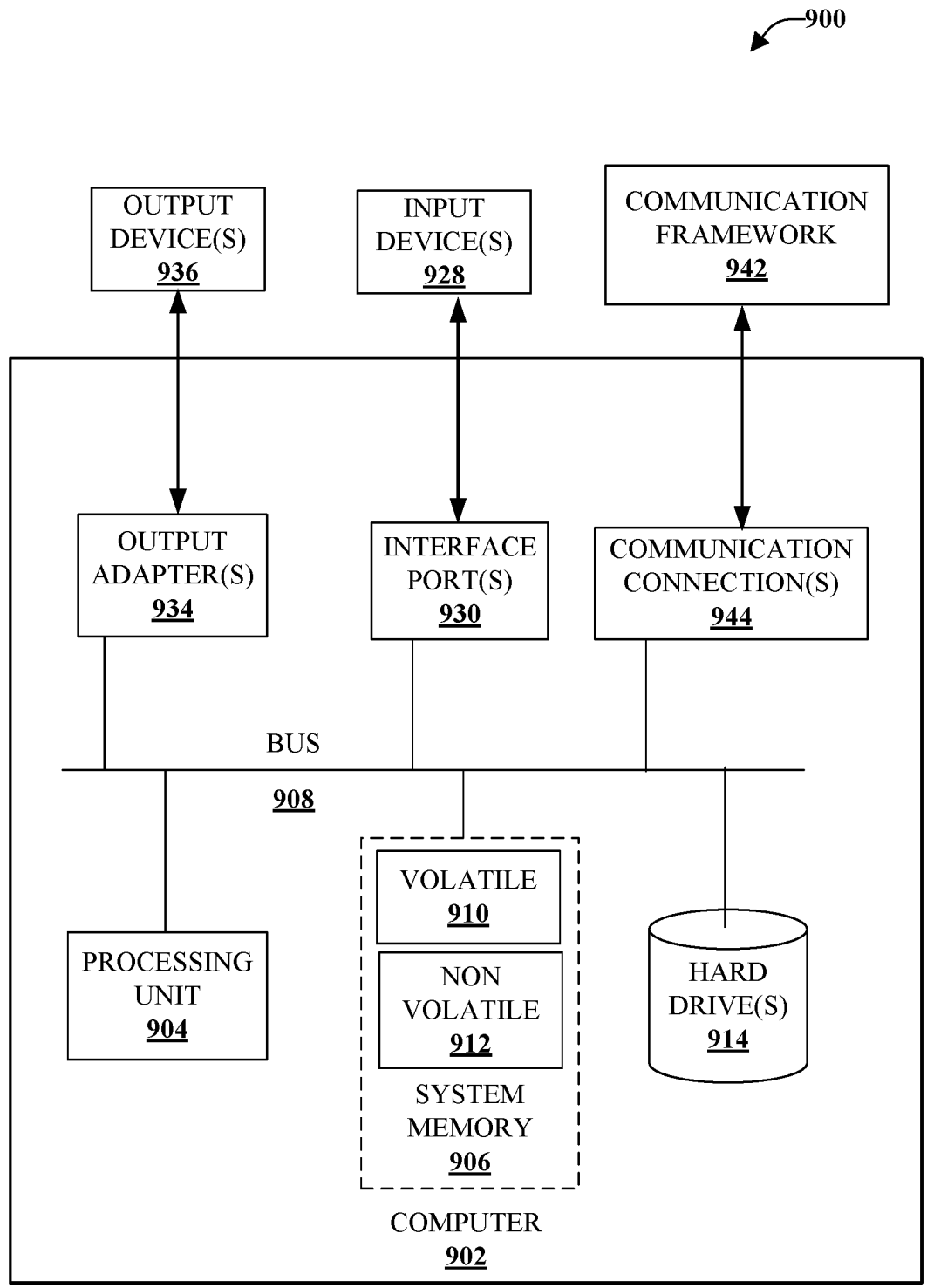
FIG. 9 is a block diagram of a functional computer system in accordance with various embodiments described herein.

What has been described above may be further understood with reference to the following figures. FIGS. 8 and 9 provide exemplary operating environments or systems capable of implementing one or more systems, apparatuses, or processes described above. FIGS. 8 and 9 are not intended to limit the scope of such systems, apparatuses, or processes. By way of example, computing environment 800 may refer to one or more embodiment of the various embodiments described with reference to the above figures. However, variations to computing environment 800 may be obvious to achieve aspects or processes described herein.

FIG. 8 is a schematic diagram of a computing environment 800 in accordance with various disclosed aspects. It is noted that environment 800 may include various other components or aspects. As depicted, system 800 may include one or more client(s) 802, one or more server(s) 804, one or more client data store(s) 820, one or more server data store(s) 810, and a communication framework 806.

While depicted as a desktop computer(s), client(s) 802 may include various other devices that may comprise hardware and/or software (e.g., program threads, processes, computer processors, non-transitory memory devices, etc.). In an example, client(s) 802 may include laptop computers, smart phones, tablet computers, blender devices, wearables, etc.). The client(s) 802 may include or employ various aspects disclosed herein. For example, client(s) 802 may include or employ all or part of various systems (e.g., system 100) and processes disclosed herein.

Likewise, server(s) 804 may include various devices that may comprise hardware and/or software (e.g., program threads, processes, computer processors, non-transitory memory devices, etc.). Server(s) 804 may include or employ various aspects disclosed herein. For example, server(s) 804 may include or employ all or part of various (e.g., system 100) and processes disclosed herein. It is noted that server(s) 804 and client(s) 802 may communicate via communication framework 806. In an exemplary communication, client(s) 802 and server(s) 804 may utilize packeted data (e.g., data packets) adapted to be transmitted between two or more computers. For instance, data packets may include coded information associated with blending processes, dietary information of ingredients, or the like.

Communication framework 806 may comprise various network devices (e.g., access points, routers, base stations, etc.) that may facilitate communication between client(s) 802 and server(s) 804. It is noted various forms of communications may be utilized, such as wired (e.g., optical fiber, twisted copper wire, etc.) and/or wireless (e.g., cellular, Wi-Fi, near field communication, etc.) communications.

In various embodiments, client(s) 802 and server(s) 804 may respectively include or communicate with one or more client data store(s) 820 or one or more server data store(s) 810. The data stores may store data local to client(s) 802 or server(s) 804.

In at least one embodiment, a client of client(s) 802 may transfer data describing a recipe, user account data, ratings, or the like to a server of server(s) 804. The server may store the data and/or employ processes to alter the data. For example, the server may transmit the data to other clients of client(s) 802.

FIG. 9 is a block diagram of a computer system 900 that may be employed to execute various disclosed embodiments. It is noted that various components may be implement in combination with computer executable instructions, hardware devices, and/or combinations of hardware and software devices that may be performed by computer system 900.

Computer system 900 may include various components, hardware devices, software, software in execution, and the like. In embodiments, computer system 900 may include computer 900. Computer 900 may include a system bus 908 that couples various system components. Such components may include a processing unit(s) 904, system memory device(s) 906, disk storage device(s) 914, sensor(s) 935, output adapter(s) 934, interface port(s) 930, and communication connection(s) 944. One or more of the various components may be employed to perform aspects or embodiments disclosed herein. In an aspect, the computer system 900 may "learn," such as described above user preferences based upon modifications of recipes by users, through rating of recipes both positively and negatively. For example, the computer system 900 may modify a particular recipe (or a set thereof) as the majority of users or supermajority thereof have disapproved of the recipe (such as for taste, texture, consistency, temperature, or a variety of these factors). The computer system 900 may dynamically push out the revised recipe or receive the revised recipe as applicable.

Processing unit(s) 904 may comprise various hardware processing devices, such as single core or multi-core processing devices. Moreover, processing unit(s) 904 may refer to a "processor," "controller," "computing processing unit (CPU)," or the like. Such terms generally relate to a hardware device. Additionally, processing unit(s) 904 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the like.

System memory 906 may include one or more types of memory, such volatile memory 910 (e.g., random access memory (RAM)) and non-volatile memory 912 (e.g., read-only memory (ROM)). ROM may include erasable programmable ROM (EPROM), electrically erasable programmable ROM (EEPROM). In various embodiments, processing unit(s) 904 may execute computer executable instructions stored in system memory 906, such as operating system instructions and the like.

Computer 902 may also include one or more hard drive(s) 914 (e.g., EIDE, SATA). While hard drive(s) 914 are depicted as internal to computer 902, it is noted that hard drive(s) 914 may be external and/or coupled to computer 902 via remote connections. Moreover, input port(s) 930 may include interfaces for coupling to input device(s) 928, such as disk drives. Disk drives may include components configured to receive, read and/or write to various types of memory devices, such as magnetic disks, optical disks (e.g., compact disks and/or other optical media), flash memory, zip drives, magnetic tapes, and the like.

It is noted that hard drive(s) 914 and/or other disk drives (or non-transitory memory devices in general) may store data and/or computer-executable instructions according to various described embodiments. Such memory devices may also include computer-executable instructions associated with various other programs or modules. For instance, hard drives(s) 914 may include operating system modules, application program modules, and the like. Moreover, aspects disclosed herein are not limited to a particular operating system, such as a commercially available operating system.

Input device(s) 928 may also include various user interface devices or other input devices, such as sensors (e.g., microphones, pressure sensors, light sensors, etc.), scales, cameras, scanners, facsimile machines, and the like. A user interface device may generate instructions associated with user commands. Such instructions may be received by computer 902. Examples of such interface devices include a keyboard, mouse (e.g., pointing device), joystick, remote controller, gaming controller, touch screen, stylus, and the like. Input port(s) 930 may provide connections for the input device(s) 928, such as via universal serial ports USB ports), infrared (IR) sensors, serial ports, parallel ports, wireless connections, specialized ports, and the like.

Output adapter(s) 934 may include various devices and/or programs that interface with output device(s) 936. Such output device(s) 936 may include LEDs, computer monitors, touch screens, televisions, projectors, audio devices, printing devices, or the like.

In embodiments, computer 902 may be utilized as a client and/or a server device. As such, computer 902 may include communication connection(s) 944 for connecting to a communication framework 942. Communication connection(s) 944 may include devices or components capable of connecting to a network. For instance, communication connection(s) 944 may include cellular antennas, wireless antennas, wired connections, and the like. Such communication connection(s) 944 may connect to networks via communication framework 942. The networks may include wide area networks, local area networks, facility or enterprise wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework 942 may include multiple networks connected together. For instance, a Wi-Fi network may be connected to a wired Ethernet network.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the blending system 100. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender system comprising:
a blender base comprising a housing and a motor disposed within the housing;
a container selectively connected to the blender base; and
a user device operatively communicating with the blender base, wherein the user device comprises at least one sensor operatively capturing an image of at least one ingredient, an image of packaging of the at least one ingredient, a bar code associated with the at least one ingredient, or an identification code associated with the at least one ingredient,
wherein the user device comprises a controller configured to operatively alter an inventory stored in a memory, wherein the inventory comprises a list of available ingredients and quantities of the available ingredients based on recognizing the available ingredients and monitoring use of the available ingredients, and wherein the controller identifies the at least one ingredient being blended based on output from the at least one sensor and alters quantities of the available ingredients in the inventory stored in the memory.

2. The blender system of claim 1, further comprising a weight sensor that operatively measures an amount of at least one ingredient added into the container.

3. The blender system of claim 2, wherein the user device monitors the use of the available ingredients by altering the inventory based at least in part on measurements received from the weight sensor.

4. The blender system of claim 2, wherein the container comprises the weight sensor.

5. The blender system of claim 2, wherein the blender base comprises the weight sensor.

6. The blender system of claim 2, wherein the weight sensor is selectively attached to at least one of the blender base or the container.

7. The blender system of claim 1, wherein the user device operatively sends instructions to a remote database to alter the inventory.

8. A blender system comprising:
   a blender base comprising a housing and a motor disposed within the housing;
   a container selectively connected to the blender base;
   a user device operatively communicating with the blender base, wherein the user device comprises at least one sensor operatively capturing an image of at least one ingredient, an image of packaging of the at least one ingredient, a bar code associated with the at least one ingredient, or an identification code associated with the at least one ingredient and wherein the user device comprises a controller configured to operatively alter an inventory stored in a memory; and
   a remote computing device communicating with the user device through a communication framework,
   wherein the user device comprises a controller generating instructions to the blender base to operate the motor to prepare foodstuff according to instructions received from the remote computing device and wherein the controller identifies the at least one ingredient being blended based on output from the at least one sensor and alters quantities of available ingredients in the inventory stored in the memory.

9. The blender system of claim 8, wherein the remote computing device comprises an application program interface defining protocols for communication with at least one of the blender base or the user device.

10. The blender system of claim 8, wherein the remote computing device comprises a business logic component.

11. The blender system of claim 10, wherein the business logic component receives information from the blender base regarding sensory data.

12. The blender system of claim 11, wherein the business logic component automatically orders ingredients based on a history of foodstuff preparation.

13. A blender system comprising:
   a point of sale device operatively receiving input defining an order of a product to be blended;
   a blender station comprising a blender base comprising a housing and a motor disposed within the housing; and
   at least one other station for preparing the product, wherein the at least one other station comprises at least one of a liquid dispensing station, a dry-goods dispensing station, and/or an ice dispensing station;
   wherein the point of sale device associates a blending container with the product and defines a set of instructions for preparing the product wherein a first portion of the set of instructions is to be performed by the blender station, and wherein a second portion of the set of instructions is to be performed by the at least one other station;
   wherein, in response to the at least one other station detecting the blending container, the at least one other station dispenses a predetermined quantity of at least one of a liquid, a dry-good, and/or ice based on the second portion of the set of instructions; and
   wherein, in response to the blender station detecting the blending container, the blender base identifies a blending program based on the first portion of the set of instructions.

14. The blender system of claim 13, wherein the point of sale device, the blender station, and the at least one other station each comprise at least one near field communication device.

15. The blender system of claim 14, wherein the blending container comprises a near field communication device and that stores an identification token and communicates the identification token with at least one of the point of sale device, the blender station, and the at least one other station.

16. The blender system of claim 15, wherein the point of sale device associates the identification token with the order.

17. The blender system of claim 15, wherein the at least one other station identifies and operatively communicates with the near field communication device of the container to receive the identification token, and communicate with the point of sale device to determine whether the identification token is associate with an open order.

18. The blender system of claim 15, further comprising a database storing blending container profiles, the blending container profiles comprising identification tokens and histories of use.

* * * * *